Patented June 17, 1930

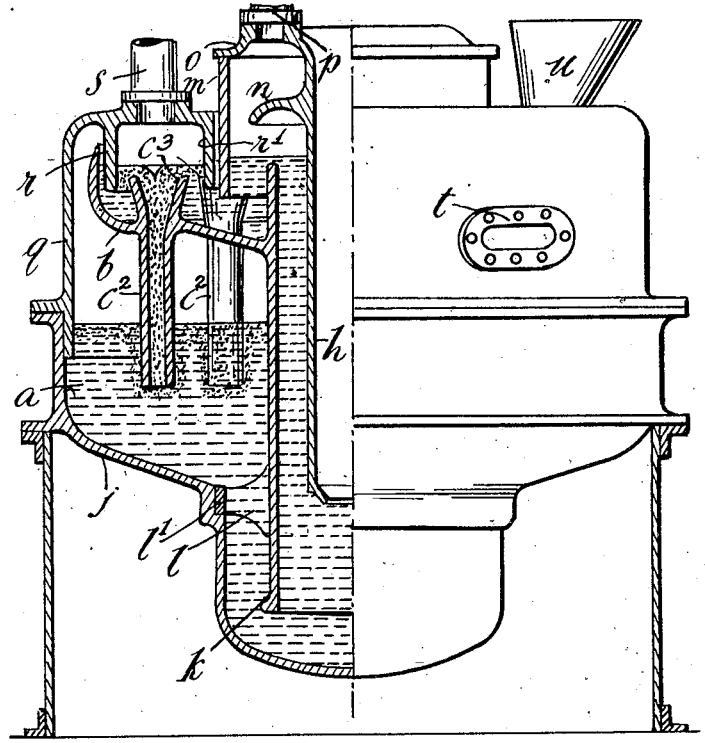
Fig. 4.
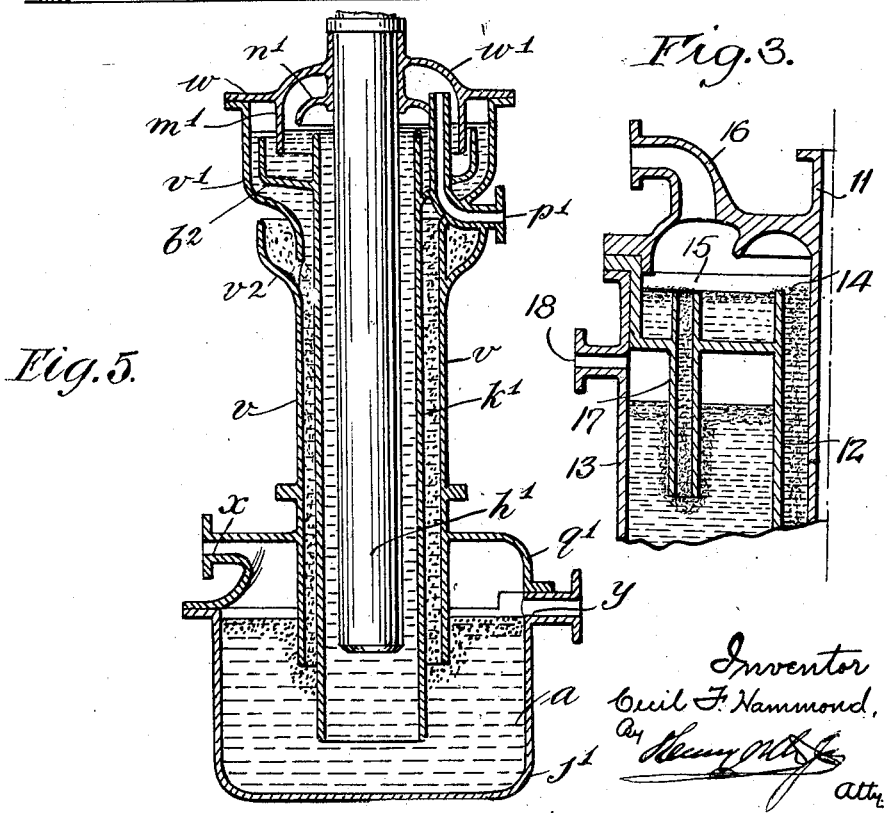
Fig. 5.
Fig. 3.
Inventor
Cecil F. Hammond,

1,765,148

UNITED STATES PATENT OFFICE

CECIL FEATHERSTONE HAMMOND, OF WESTMINSTER, LONDON, ENGLAND, ASSIGNOR OF ONE-FIFTH TO WILLIAM SHACKLETON, OF LONDON, ENGLAND

HEAT-TREATMENT PROCESS AND APPARATUS IN WHICH A HOT LIQUID MASS IS EMPLOYED

Application filed April 1, 1927, Serial No. 180,318, and in Great Britain April 15, 1926.

This invention comprises improvements relating to heat treatment processes and apparatus in which the treatment material is caused to move beneath the surface of a circulating liquid mass. The employment of baths of hot liquids, and notably baths of molten metal such as lead, for the heating of numerous materials in the industrial treatment thereof, has been the subject of much research work and development in recent years. Distillations, dehydration, concentration, carbonization, oil-cracking and other processes involving the application of heat to diffused or distributed material have been the subject of proposed improvements involving the employment of the hot liquid or molten metal bath.

The object of the present invention is to improve the entrainment of material beneath the surface of the hot liquid mass so that heat is applied adequately and uniformly to all particles of material in a reliable and efficient manner.

In a heat treatment process in accordance with this invention, matter which is susceptible to a change of condition under the action of heat is admitted to and entrained by a descending stream or column of the hot liquid mass in circulation so that it is carried down beneath the surface of the mass.

The material is carried down to a predetermined depth beneath the surface of the hot liquid mass and its return by flotation to such surface may be governed by baffles or the like. In this way, the length of a treatment course through the body of liquid can be pre-determined for any given material to be treated.

Methods and apparatus in accordance with these improvements can be adapted for stage treatment of materials and where products of distillation are to be obtained these can be drawn off separately from the different stages.

In order to enable the invention to be readily understood, reference is made to the accompanying drawing, illustrating several practical examples, in which drawing:—

Figure 3 is a central vertical half section of the top portion of an apparatus permitting of a two-stage treatment.

Figure 4 is partly a central vertical section, and partly a side elevation of an apparatus comprising a submerged flame burner-holder and adapted for the entrainment by vortex effect of material to be treated and for the drawing off of distillation products at different stages.

Figure 5 is a central vertical section of an apparatus in which the material to be treated, is entrained by induction effect into a descending stream of the hot liquid mass.

Figure 1:
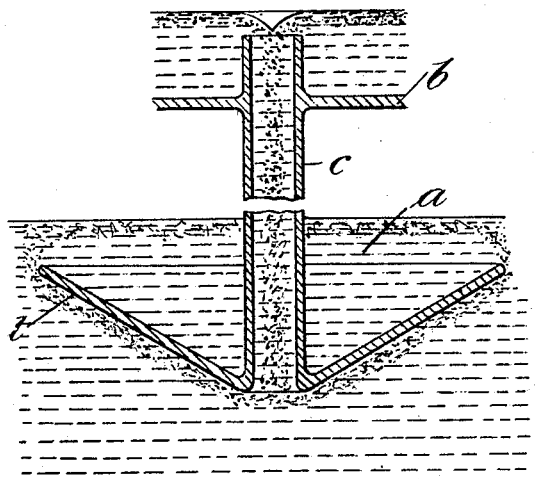
Figure 1 is a central vertical section, more or less diagrammatic, of a piece of apparatus adapted for utilizing the vortex effect of a descending stream for the entrainment of material to be treated.

Referring to Figure 1, $a$ is a bath of hot liquid or molten material, such as molten lead, and $b$ is an elevated pan or receptacle from which a downtake pipe $c$ descends into the bath $a$. The upper end of the pipe $c$ projects upwardly above the bottom of the receptacle $b$ as shown and the lower end thereof may be fitted with a baffle device in the form of an inverted hollow cone $d$. Lifting means, not shown, are provided for maintaining an ascending stream from the bath $a$ to the receptacle $b$ and such means may comprise an air-lift pipe, ejector device, or the like. Or a submerged flame burner may be employed as hereinafter described.

When the lifting means is in operation, the bath $a$, being maintained at a suitable temperature, hot liquid or molten material is delivered to the receptacle $b$ and when the depth of the charge in $b$ exceeds the height of the portion of the pipe $c$ upstanding therein, an overflow takes place down the pipe $c$. Material to be treated is fed on to the surface of the charge in $b$ and forms a flotation layer thereon as seen in the drawing. Such material is drawn into the stream descending the pipe $c$, the vortex action of the said stream having the effect of entraining material into the stream and mixing it with the hot liquid or molten material. The material thus entrained is delivered at a depth beneath the surface of the bath $a$ which depth is determined by the depth of submergence of the outlet from the pipe $c$. If the baffle or deflector $d$ is present, the material upon emerging from the pipe $c$ will have an extended course of ascent from the said depth to the surface of the bath $a$, as indicated diagrammatically in Figure 1. Consequently, the length of the course traversed by the entrained material beneath the surface of the bath $a$ can be determined with approximate accuracy. Thus the time during which any given material is subjected to the heat of the hot liquid or molten mass by contact therewith and immersion therein can be adjusted for effecting the desired treatment of that material.

Figure 2:
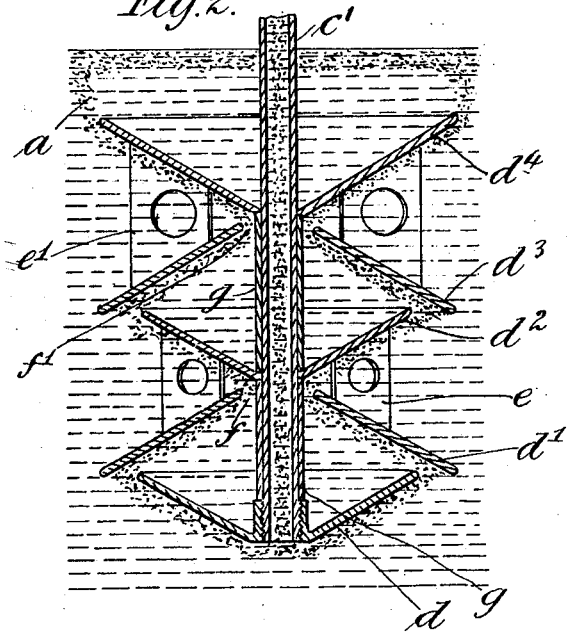
Figure 2 is a view similar to Figure 1, but comprising a number of baffle devices for prolonging the course of the entrained material through the treatment bath.

Referring to Figure 2, it will be seen that the downtake pipe $c'$ extends to a greater depth below the surface of the bath $a$ and is fitted with a series of baffles for causing the entrained material to follow a tortuous or zig-zag course during its ascent from the point of exit from the pipe $c'$ to the surface of the bath $a$. Thus, immediately above the inverted cone $d$ there is an upright cone $d'$ suspended by webs $e$ from an inverted cone $d^2$, an annular opening or port $f$ being formed at the apex of the cone $d'$. Immediately above the cone $d^2$, there is an upright cone $d^3$, suspended by webs $e'$ from an inverted cone $d^4$ and having a port $f'$ at its apex. These conical baffles may be disposed in suitable relation by mounting them on tubular distance pieces $g$ which are slipped on to the downtake tube $c'$. As will be apparent from Figure 2, the entrained material upon emerging from the lower end of the pipe $c'$ passes outwardly over the convexity of the baffle $d$ and then inwardly beneath the baffle $d'$ to the port $f$ which delivers it on to the convexity of the baffle $d^2$. The latter directs the material to the underside of the baffle $d^3$, so that the ascent continues up to and through the port $f'$, the baffle $d^4$ finally directing the ascending material to the surface of the bath. Any desired number of baffles may be employed for the attainment of an ascending course of any required length.

The invention may be advantageously employed in connection with the stage heat-treatment of materials, such as the fractional distillation of hydrocarbons. Referring to the arrangement shown in Figure 3 and assuming hydrocarbons to be treated, these are introduced through the tube 11 descending into the air-lift tube 12 of a pot 13. The entrainment of the hydrocarbons lightens the column and produces an air-lift action so that the molten metal or hot liquid overflows at 14 into an upper chamber 15. First products of distillation are taken away at 16 and the residue forms a flotation layer on the charge retained in the chamber 15. One or more downtakes or vortex tubes 17 descend from the chamber 15 to a suitable depth below the liquid level in the main pot 13, and the descending stream entrains material from the flotation layer and carries it into the hot liquid mass in the pot 13, whereupon the said material rises to the surface as indicated. The second products of distillation are taken away at 18 and the residue forms a flotation layer in the pot 13 and may be removed by suitable means.

The advantages of this invention are realized particularly when a submerged flame burner is employed for the heating, and the products of combustion from such a burner are released within a circulator or air-lift tube in which the gases aerate the column and produce an air-lift action as described in the specification belonging to our Patent No. 1,668,504, dated May 1, 1928.

Referring to Figure 4 $h$ is a tubular casing or burner holder centrally arranged within a pot $j$ containing the bath $a$ of molten material or hot liquid and adapted for the reception of a burner of the submersible type. The casing or burner holder $h$ is surrounded by a concentric air lift tube $k$, the lower end of which is near the bottom of the pot $j$ and the upper end of which rises well above the surface level of the bath $a$ and is upstanding above the bottom of an elevated annular pan or receptacle $b$. The tube $k$, is formed at the lower part with centralizing supports $l$ connected to a ring $l'$ which rests in an annular recess in the pot $j$ and at the upper part with webs supporting a concentric cylindrical part $m$. The casing or holder $h$ is formed with a shield or deflector $n$ and with an annular dome or hood $o$ fitted with a duct $p$ for the escape of gases of combustion. A flange on the hood $o$ rests upon the cylindrical part $m$. The pan or receptacle $b$ is formed or fitted with one or any suitable number of downtake pipes $c^2$. The upper portions $c^3$ of these pipes $c^2$, which are upstanding within the pan or receptacle $b$ may be flared, as shown, in order to increase the diameter of the vortex. The annular cover $q$ of the pot $j$ is formed with annular depending skirts $r$, $r'$ which extend below the level of the flared mouths $c^3$ when the cover $q$ is in position on the pot as shown. The top of the cover $q$ is fitted with a draw-off duct $s$ which opens into the annular space between the skirts $r\ r'$, and the cylindrical wall of the cover $q$ is formed with a flanged draw-off opening $t$ to which a second draw-off duct may be bolted.

Assuming an ignited burner to have been inserted into the casing or holder $h$, the mass composing the bath $a$ is heated or melted by the combustion, the nozzle of the burner being well below the surface level of the bath $a$ so that the flame is submerged. The hot gases of combustion escape into the circulator or air-lift tube $k$ and aerate the column therein, whereupon the column rises and overflows the upper end of the tube $k$ and charges the pans $b$ until the level rises above the flared mouths $c^3$. Any hot liquid or molten matter projected upwards by the gases is deflected downwards by the deflector $n$ and the gases of combustion escape through the duct $p$. Material to be treated is fed through a suitable hopper device $u$ on to the surface of the hot liquid or molten matter between the skirts $r\ r'$ which depend below such surface and are sealed by the liquid. If distillates are to be drawn off, the feed hopper device $u$ may be of the type comprising a feed valve device for passing material into the apparatus whilst preventing any appreciable escape of distillation products. The material, thus fed in, forms a flotation layer on the surface of the hot liquid or molten matter lying between the skirts $r\ r'$, and any distillation products given off during the initial heating thus effected, are drawn off through the duct $s$. The hot liquid or molten matter overflows, as aforesaid, the flared mouths $c^3$, and descend the downtake pipes $c$, the vortex thereby created in each mouth $c^3$ being effective for entraining material from the flotation layer into the descending stream. The entrained material is delivered beneath the surface of the bath $a$, as shown, and thereupon rises to such surface. Distillation products released by this further heating may be drawn off through the opening $t$.

Referring to the further modification illustrated in Figure 5, the burner tube $h'$ is disposed centrally within a lift tube $k'$ which, in turn, is concentrically disposed within a downtake $v$. The last-named is supported by the cover $q'$ of a pot $j'$ and the lower ends of all tubes extend below the surface of the bath $a$ of hot liquid or molten matter contained in the pot $j'$. The top part of the downtake $v$ is enlarged to form a receptacle $v'$ and is formed, just beneath this receptacle, with an annular or other suitable feed hopper $v^2$ communicating by ports with the downtake $v$. The upper end of the lift tube $k'$ is formed with an annular pan $b^2$ and is supported in and by the downtake in any suitable manner. A cover $w$ for the receptacle $v'$ is formed with a dome $w'$ from which products of combustion can be drawn off through the bent tube $p'$. It is also formed with a deflector or shield $n'$ extending over the lift tube and with a depending skirt $m'$ for dipping into the liquid in the pan $b^2$ and sealing the dome $w'$. In operation the gases of combustion, aerate the annular column between the tubes $h'\ k'$ so that the column rises and overflows into the pan $b^2$ the gases escaping past the deflector $n'$ into the dome $w'$. When the pan $b^2$ fills, the hot liquid or molten matter overflows into the receptacle $v'$ and thereupon descends through the down-take $v$. As the descending stream passes the ports opening into the hopper $v^2$, the latter being suitably charged with liquid or finely divided solid material for treatment, the inductive action of the stream entrains such material which is carried downwards by the stream to a suitable depth beneath the surface of the bath $a$. Products of distillation are drawn off through the duct $x$ on the cover $q'$ and floating residue may be raked off or drawn off, through a suitable hand hole or pipe connection $y$ as will now be readily understood.

I claim:—

1. In heat treatment comprising the employment of a heated circulatory liquid mass, the utilization of a defined stream of said mass for entraining treatment material floating on said mass, said stream being so directed as to produce descent of the entrained material into and beneath the surface of a body of the liquid mass.

2. In heat treatment comprising the employment of a heated circulatory liquid mass which is elevated during its circulation, the utilization of the vortex effect of a defined descending stream of said mass for entraining treatment material floating on said mass, said descending stream being so directed as to entrain said material into, and beneath the surface of a body of the mass.

3. In heat treatment comprising the employment of a circulatory heated liquid mass, the utilization of a defined stream of said mass for the entrainment of treatment material in flotation on said mass, said stream being so directed as to carry the entrained material into the body of the liquid mass, and said material being constrained by submerged directive means to follow an extended course through the said body.

4. Heat treatment apparatus comprising a container for a liquid mass, a heater for heating said mass, means for permitting circulation of the mass in said container, including a duct to carry a descending stream of the circulating mass below the normal surface level of said liquid mass, and means for admitting treatment material to the circulating mass where it will be entrained by the descending stream and carried down into the body of the liquid mass.

5. Heat treatment apparatus comprising a container for a liquid mass, a heater for heating said mass, a circulator tube for producing a circulation of the mass in said container, a duct adapted to carry a descending stream forming part of such circulation, admission means so disposed as to admit treatment matter at a point where it is entrained by the descending stream and carried into the body of the liquid mass, and a plurality of sealed collectors covering different portions of said mass, said collectors being adapted for the separate recovery of distillation products at different stages.

6. Heat treatment apparatus comprising a container for a hot liquid mass, a burner submerged in said mass, a circulator in association with said burner and adapted for elevating and circulating said mass, a vortex tube for returning a descending stream of said circulating mass after elevation, means for admitting treatment material to said container, such admission means being so disposed that admitted treatment material comes within the influence of the vortex in said vortex tube and is entrained by the descending stream into the body of the liquid mass.

7. Heat treatment apparatus comprising a container, a liquid mass therein, a burner of the submerged combustion type disposed with its nozzle submerged in said mass, a circulator tube surrounding said burner and rising from said mass to a suitable elevation, an elevated receptacle disposed to receive liquid elevated by and overflowing from said circulator tube, a down-stream duct extending from said elevated receptacle into said mass, and means for admitting material to be treated into the range of entraining influence exercised by a down stream in said duct.

CECIL FEATHERSTONE HAMMOND.